Dec. 19, 1950 C. E. CLEETON 2,534,232

TRIGGER CIRCUIT AND SWITCHING DEVICE

Filed Jan. 24, 1940 3 Sheets-Sheet 1

INVENTOR
CLAUD E. CLEETON

BY W. Glenn Jones
ATTORNEY

TRIGGER CIRCUIT AND SWITCHING DEVICE

Filed Jan. 24, 1940 3 Sheets-Sheet 2

INVENTOR
CLAUD E. CLEETON
BY W. Glenn Jones
ATTORNEY

TRIGGER CIRCUIT AND SWITCHING DEVICE

INVENTOR
CLAUD E. CLEETON
BY W. Glenn Jones
ATTORNEY

Patented Dec. 19, 1950

2,534,232

UNITED STATES PATENT OFFICE 2,534,232

TRIGGER CIRCUIT AND SWITCHING DEVICE

Claud E. Cleeton, Washington, D. C.

Application January 24, 1940, Serial No. 315,340

13 Claims. (Cl. 250—27)

(Granted under the act of March 3, 1883, as amended April 30, 1928; 370 O. G. 757)

My invention relates generally to switching devices utilizing vacuum tubes, and particularly to such devices having trigger circuits for setting them into operation. It also relates generally to electronic devices for controlling associated circuits, and in particular to self-locking electronic relays, electronic counters, pulse expanders and square wave generators. My invention will be described in connection with the following drawings, in which, Fig. 1 shows schematically the basic circuit of my invention, including the electronic trigger circuit;

Figure 1:
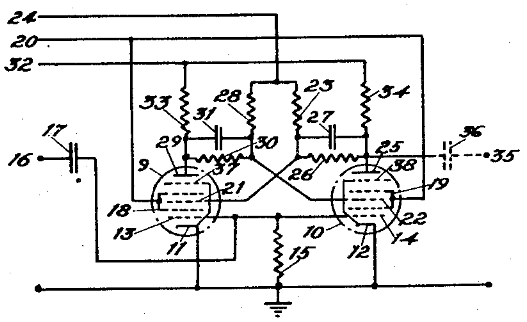

Referring to Fig. 1, two multi-grid tubes 9, 10, such as the well known pentagrid mixer or converter types, are connected in the basic circuit of my invention. The cathodes 11, 12 or both tubes are connected to ground. Grids 13 and 14 are grounded through grid leak 15, and both connect to terminal 16 through capacitor 17. The screen grids 18, 19 of both tubes are connected to the positive terminal 20 of a screen grid supply source. Grids 21 and 22 are shielded by screen grids 18 and 19 respectively. Grid 21 of tube 9 is connected to the negative terminal 24 of the direct potential grid supply source through grid resistance 23 and is also connected to the anode 25 of the opposite tube 10 through a circuit comprising resistance 26 and capacitance 27 in parallel. Grid 22 of tube 10 is connected to terminal 24 through grid resistance 28 and is also connected to the anode 29 of the opposite tube 9 through a circuit comprising resistance 30 and capacitance 31 in parallel. Both anodes 25 and 29 are connected to the positive terminal 32 of an anode direct potential supply source, anode 25 through resistance 34 and anode 29 through anode resistance 33. Terminal 35 is connected to anode 25 of tube 10 through capacitance 36. Grid 37 of tube 9 and grid 38 of tube 10 are shown internally connected to cathodes of their respective tubes.

The negative terminals of both the screen grid and the anode supply sources are connected to ground, as is the positive terminal of the grid supply source. Obviously, the same source may be employed to energize the entire circuit shown provided proper polarities are observed and appropriate voltages employed. The negative potential applied to grids 21, 22 by the source connected to terminal 24 is of such value that, if it were the only voltage applied to these grids, each tube would be biased considerably past cut-off. However, it will be noted that, in addition to the aforementioned negative potential, a positive potential is applied to each grid 21, 22 from the anode of the opposite tube. This positive potential varies in value depending upon the conductivity state of such opposite tube, i. e., when no anode current flows in tube 9, the positive potential applied to grid 22 of tube 10 from the anode 29 of tube 9 is of such value that the resultant potential of grid 22 is approximately zero. Similarly, when no anode current flows in tube 10, the resultant potential of grid 21 of tube 9 is approximately zero.

With the cathodes of tubes 9 and 10 heated in a conventional manner, when the supply voltages are applied to terminals 20, 24 and 32, shock excitation causes anode current to flow in one of tubes 9, 10, say tube 9. Due to the small circuit unbalance inevitably present, anode current does not begin to flow in both tubes simultaneously. This flow of anode current in tube 9 causes a voltage drop in anode resistance 33 with consequent reduction in the positive potential at anode 29 of tube 9 and at grid 22 of tube 10. The result of this reduction in the positive potential applied to grid 22 is that grid 22 becomes negative and anode current is prevented from flowing in tube 10. With no anode current flowing in tube 10, there is applied to anode 25 almost the full potential of terminal 32 and a correspondingly high positive potential is applied to grid 21 of tube 9, such that the resultant voltage of grid 21 is approximately zero, and anode current continues to flow in tube 9.

If now a negative pulse is applied to grids 13 and 14 through capacitance 17, the anode current of tube 9 will be reduced. This reduction in the anode current of tube 9 results in a smaller potential drop in anode resistance 33 and also in an increased positive potential being applied to anode 29. This increase in the potential of anode 29 causes a positive pulse to be transferred to grid 22 through capacitance 31 which causes anode current to begin to flow in tube 10. This flow of anode current through anode resistance 34 causes the potential of anode 25 to be reduced due to the potential drop in this resistance. This reduction of anode potential, in turn, causes a negative pulse to be applied to grid 21 of tube 9 through capacitance 27, producing a further reduction in the anode current of tube 9. This amplification process will be repeated until the anode current of tube 9 is completely cut off, with tube 10 conductive. The next succeeding incoming negative pulse will again reverse the conductivity state of the tubes, and thus restore the circuit to its original condition, i. e., with tube 9 conductive and tube 10 non-conductive.

It will be noted that there are only two stable states of anode current in the above circuit, that is, anode current flowing in one tube and zero in the other, and vice versa. When tube 9 or 10 is non-conductive the value of the resultant voltage applied to their respective grids 21, 22 is such as to prevent plate current from beginning to flow in the non-conductive tube when a positive pulse is applied to grid 13 or 14, as the case may be. A positive pulse applied to grid 13 or 14 of the conductive tube will obviously cause no change-over or reversal of the conductive state of the tubes. Thus, it is only when a negative pulse is applied to grid 13 or 14 of the conductive tube that the reversal occurs.

The circuit including capacitance 36 and terminal 35 may be utilized to couple to an external circuit the voltage variation of anode 25 of tube 10.

The circuit as well as the tubes of Fig. 1 are said to be "triggered" when negative pulses applied thereto cause a reversal in the conductive state of the tubes. The tubes and circuit are "triggered" by applying the negative pulses to grids 13 and 14, each such grid being a part of what is, in effect, a triode, the elements of one such triode being grid 13, cathode 11 and screen grid 18; the elements of the other triode being grid 14, cathode 12 and screen grid 19. Tubes 9 and 10 are coupled through circuit means including the anodes thereof and grids 21 and 22.

Used as an electronic relay, the apparatus of Fig. 1 is described as being set or re-set when tube 9 is conductive and as being tripped when tube 10 is conductive.

Electromechanical relays can be inserted in the anode circuit of either or both tubes, such relays being actuated by the flow of anode current.

Figure 2:
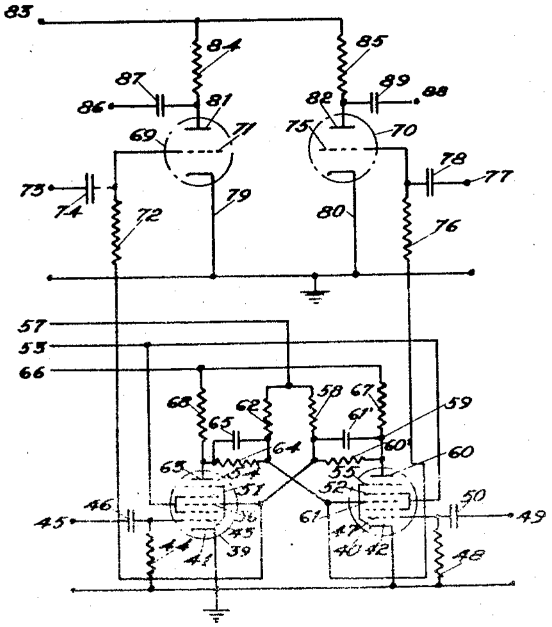
Fig. 2 is a schematic diagram of the trigger circuit adapted to serve as an electronic self-locking relay with electrical reset, in which an electromechanical relay may be controlled or a two circuit amplifier may be switched.

Variations in the circuit of Fig. 1 make it adaptable for use in connection with other circuits, as shown in the subsequent figures. In Fig. 2, there is shown the dual channel switching arrangement claimed in my co-pending application Serial No. 44,211, filed August 13, 1948, as a division of the present application. Here multi-grid tubes 39 and 40 are shown with their cathodes 41 and 42 connected to ground, with grid 43 of tube 39 grounded through grid leak 44 and connected to terminal 45 through capacitance 46, and with grid 47 of tube 40 grounded through grid leak 48 and connected to terminal 49 through capacitance 50. Screen grids 51 and 52 of tubes 39 and 40 respectively, are connected to the same positive terminal 53 of a screen grid supply source, while grids 54 and 55 are shown connected to the cathodes of their respective tubes. Grid 56 of tube 39 is connected to the negative terminal 57 of a grid supply source through grid resistance 58 and is also connected to plate 60 of tube 40 through a circuit comprising resistance 60′ and a capacitance 61′ in parallel. Grid 61 of tube 40 is connected to terminal 57 through grid resistance 62 and is further connected to anode 63 of tube 39 through a circuit comprising resistance 64 and capacitance 65 in parallel. Both anodes 60 and 63 connect to the same positive terminal 66 of an anode supply source, anode 60 through anode resistance 67, and anode 63 through resistance 68. Electric tubes 69 and 70 are amplifier tubes of any type having at least one anode, a grid and a cathode. Grid 71 of tube 69 is connected to grid 56 of tube 39 through coupling resistance 72 and to input terminal 73 through capacitance 74. Grid 75 of tube 70 is connected to the grid 61 of tube 40 through coupling resistance 76 and to input terminal 77 through capacitance 78. Cathode 79 of tube 69 and cathode 80 of tube 70 are both connected to ground, either directly or through a suitable resistance (not shown). Anodes or plates 81 and 82 of tubes 69 and 70 respectively, are connected to the positive terminal 83 of a direct potential plate supply source, anode 81 through plate impedance 84 and anode 82 through plate impedance 85. Anode 81 is connected to output terminal 86 through capacitance 87 while anode 82 connects to output terminal 88 through capacitance 89. The negative terminals of the supply sources connected to terminals 53, 66 and 83 are all connected to ground, while the positive terminal of the grid supply source connected to terminal 57 is likewise grounded. As in Fig. 1, the same source may be utilized to energize terminals 53, 57, 66 and 83, provided proper polarities are observed and proper potentials utilized.

The circuit of Fig. 2 operates as follows: When the supply potentials are applied to terminals 53, 57, 66 and 83, the circuit including tubes 39 and 40 will assume one of the stable conditions described in Fig. 1, that is, with one tube conductive and with no anode current flowing in the other. Suppose in the particular stable condition assumed by the circuit, tube 39 is conductive. A negative pulse then applied to grid 43 of tube 39 through capacitance 46 will produce a reversal or change-over, in the manner described in the explanation of Fig. 1, and tube 40 will now be conductive with tube 39 non-conductive. Additional negative pulses applied to grid 43 will produce no effect on the plate current of either tube, nor will positive pulses applied to this grid be able to cause a flow of plate current in tube 39. To cause a reversal or changeover it will now be necessary to apply a negative pulse to grid 47 of tube 40 through capacitance 50. Thus, the reversal is obtained by applying a negative pulse to grid 43 or 47, as the case may be, of the particular tube which may be conductive at the time.

Grid 71 of tube 69 has the same potential with respect to its cathode 79, and hence with respect to ground, as has grid 56 of tube 39. Also, grid 75 of tube 70 has the same potential with respect to its cathode 80 and hence with respect to ground, as grid 61 of tube 40. This being so, when tube 39 is conductive and tube 40 non-conductive, one of the two stable states of the circuit, the potential of grid 56 of tube 39 and of grid 71 of tube 69 is approximately zero and tube 69 will amplify voltages applied to grid 71 through capacitance 74, such amplified voltage appearing at terminal 86. At the same time, the potential of grid 61 of tube 40 and also of grid 75 of tube 70 being negative with respect to its cathode, no plate current will flow in tube 70 and no output voltage will appear at terminal 88 when voltages are applied to grid 75 through capacitance 78. If a negative pulse is applied to grid 43 of tube 39, a reversal of the conductive state of tubes 39 and 40 will occur as previously described, and tube 39 now becomes non-conductive with tube 40 conductive. When this occurs, tube 69 will block voltages applied to its grid 71 while tube 70 will amplify voltages applied to grid 75, the amplified output of tube 70 appearing at terminal 88. If then a negative pulse be applied to grid 47 of tube 40, such will cause a reversal of the conductive state of tubes 39 and 40 and a consequent reversal in the amplifying state of tubes 69 and 70. This process of switching the amplifier tubes from an amplifying to a non-amplifying state, and vice versa, may be continued by applying negative pulse alternately to grids 43 and 47. Through the connections including resistances 72 and 76, amplifier tubes 69 and 70 are thus so coupled to tubes 39 and 40, respectively, as to be controlled thereby.

Figure 3:
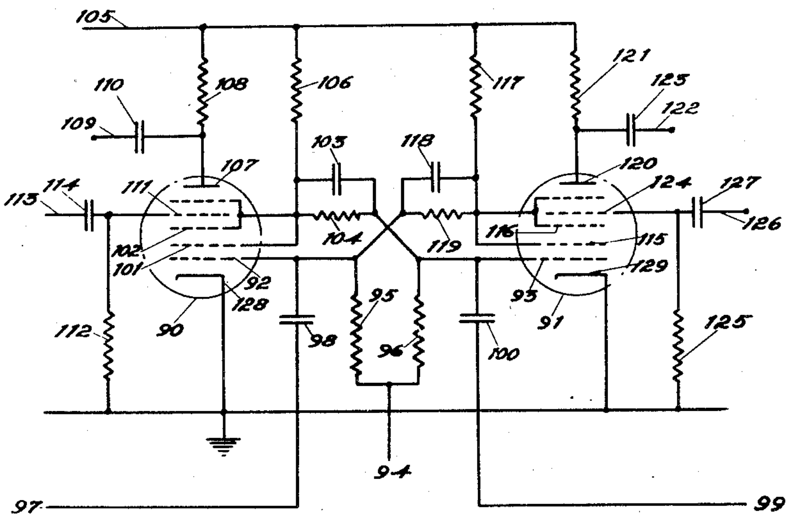
Fig. 3 is a schematic diagram using one pair of tubes in a two circuit amplifier switching circuit.

In Fig. 3, there is shown a modification of the embodiment of Fig. 2 also claimed in my divisional application, supra. In this embodiment the trigger circuits, amplifier switching circuits and amplifier circuits are combined in a single pair of tubes 90 and 91, which are preferably of the type known as the 6A8, but other pentagrid or pentode tubes will operate successfully in the circuit shown. In this figure, grids 92 and 93 are connected to a common terminal 94 to which the negative terminal of a grid supply source is applied, grid 92 through grid resistance 95 and grid 93 through grid resistance 96. Grid 92 is also connected to terminal 97 through capacitance 98 while grid 93 is connected to terminal 99 through capacitance 100. Grid 101 of tube 90 is connected to screen grid 102 of this same tube and both grids 101 and 102, are connected to grid 93 of tube 91 through a circuit comprising capacitance 103 and resistance 104 in parallel. Grids 101 and 102 are further connected to terminal 105 through screen grid resistance 106. The positive terminal of a common anode and screen grid supply source is applied to terminal 105. Anode 107 of tube 90 is connected to terminal 105 through anode resistance 108 and also to output terminal 109 through capacitance 110. Grid 111 is connected to ground through grid leak 112 and is also connected to input terminal 113 through capacitance 114. Grid 115 and screen grid 116 of tube 91 are both connected to terminal 105 through screen grid resistance 117 and are also connected to grid 92 of the other tube 90 through a circuit comprising capacitance 118 and resistance 119 in parallel. Anode 120 connects to terminal 105 through anode resistance 121 and to output terminal 122 through capacitance 123. Grid 124 is connected to ground through grid leak 125 and is also connected to input terminal 126 through capacitance 127. Both cathodes, 128 of tube 90 and 129 of tube 91, are grounded. In this circuit, the coupling between tubes, which is necessary for the reversal of conductivity of the tubes responsive to triggering pulses, is between grid 92 of tube 90 and grids 115 and 116 of tube 91, and also between grid 93 of tube 91 and grids 101 and 102 of tube 90. A grid supply source is connected between terminal 94 and ground, the negative terminal of such grid supply source being connected to terminal 94. If desired, all the above supply potentials may be supplied from a single source.

In operation, anode and screen current will begin to flow first in one tube, say tube 90, when the supply voltages are applied, the flow of current to grid 101 and screen grid 102 through resistance 106 causing a voltage drop in resistance 106 and a reduction in the positive potential applied to grid 101 and screen grid 102. This same positive potential is likewise applied to grid 93 of the opposite tube 91 through resistance 104. A negative potential is also applied to grid 93 from terminal 94 through resistance 96 of such value that when tube 90 is not conductive, and hence with no current flow to grid 101 and screen grid 102 and no voltage drop in resistance 106, the resultant potential of grid 93 is approximately zero. Thus, when grid 101 and screen grid 102 draw current with consequent reduction in the positive potential applied to grid 93, grid 93 becomes negative and tube 91 remains non-conductive, with neither of its anode 120 nor its grid 115 nor screen grid 116 drawing current. With no current flow through resistance 117, the positive potential applied to grid 92 of tube 90 through resistance 119 is of such value that the resultant potential of grid 92 is approximately zero, and tube 90 will remain conductive.

If now, a negative pulse be applied to terminal 97, and hence to grid 92 of tube 90 through capacitance 98, the current flow to grid 101 and screen grid 102 will decrease, and the positive potential applied to these grids and also to grid 93 of tube 91 will increase sufficiently that grid 115 and screen grid 116 of tube 91 will begin to draw current. Such will cause a decrease in the positive potential applied to grids 115 and 116 due to the voltage drop in resistance 117, the resultant voltage of grid 92 of tube 90 will become negative, the current drawn by grid 101 and screen grid 102 will be further decreased, until tube 90 reaches a stable non-conductive state with tube 91 conductive. If now a negative pulse be applied to grid 93 of tube 91, such will cause a reversal in the conductive state of the tubes in a similar manner.

Similarly, with tube 90 non-conductive and tube 91 conductive, a positive pulse applied to grid 92 through capacitance 98 will cause a reversal, due to the great controlling effect of grid 92 on the current drawn by screen grid 102 and grid 101. This positive pulse will cause grid 101 and screen grid 102 to draw current, which current flowing through resistance 106 causes a reduction in the positive potential applied to grid 93 of tube 91, such that the resultant potential of grid 93 will be negative. This in turn will cause a reduction in the current to grids 115 and 116, a reduced potential drop in resistance 117 and an increase in the positive potential applied to grid 92, such that tube 90 will then become conductive and tube 91 non-conductive. In a like manner, if tube 90 is conductive and tube 91 non-conductive, a positive pulse applied to grid 93 of tube 91 through capacitance 100 will produce a reversal or change-over in the conductive state of the tubes. When tube 90 is conductive, voltages applied to terminal 113 and hence to grid 111 through capacitance 114 will be amplified by this tube, the amplified output voltage appearing at terminal 109. When tube 90 is non-conductive, voltages applied to terminal 113 will produce no output at terminal 109. Similarly, when tube 91 is conductive, it will amplify voltages applied to terminal 126 and hence to grid 124 through capacitance 127, the amplified output voltage appears at terminal 122; when tube 91 is non-conductive, it will block voltages applied to terminal 126.

By connecting together terminals 113 and 126 (Fig. 3) or terminals 73 and 77 (Fig. 2), the circuit of either Fig. 2 or Fig. 3 can be used to switch a single alternating voltage applied to such interconnected terminals alternately to two terminals. Or, by connecting together terminals 86 and 88 (Fig. 2) or terminals 109 and 122 (Fig. 3), the circuits of either Fig. 2 or Fig. 3 can be used to switch two independent alternating voltages alternately to a common terminal.

Figure 4:
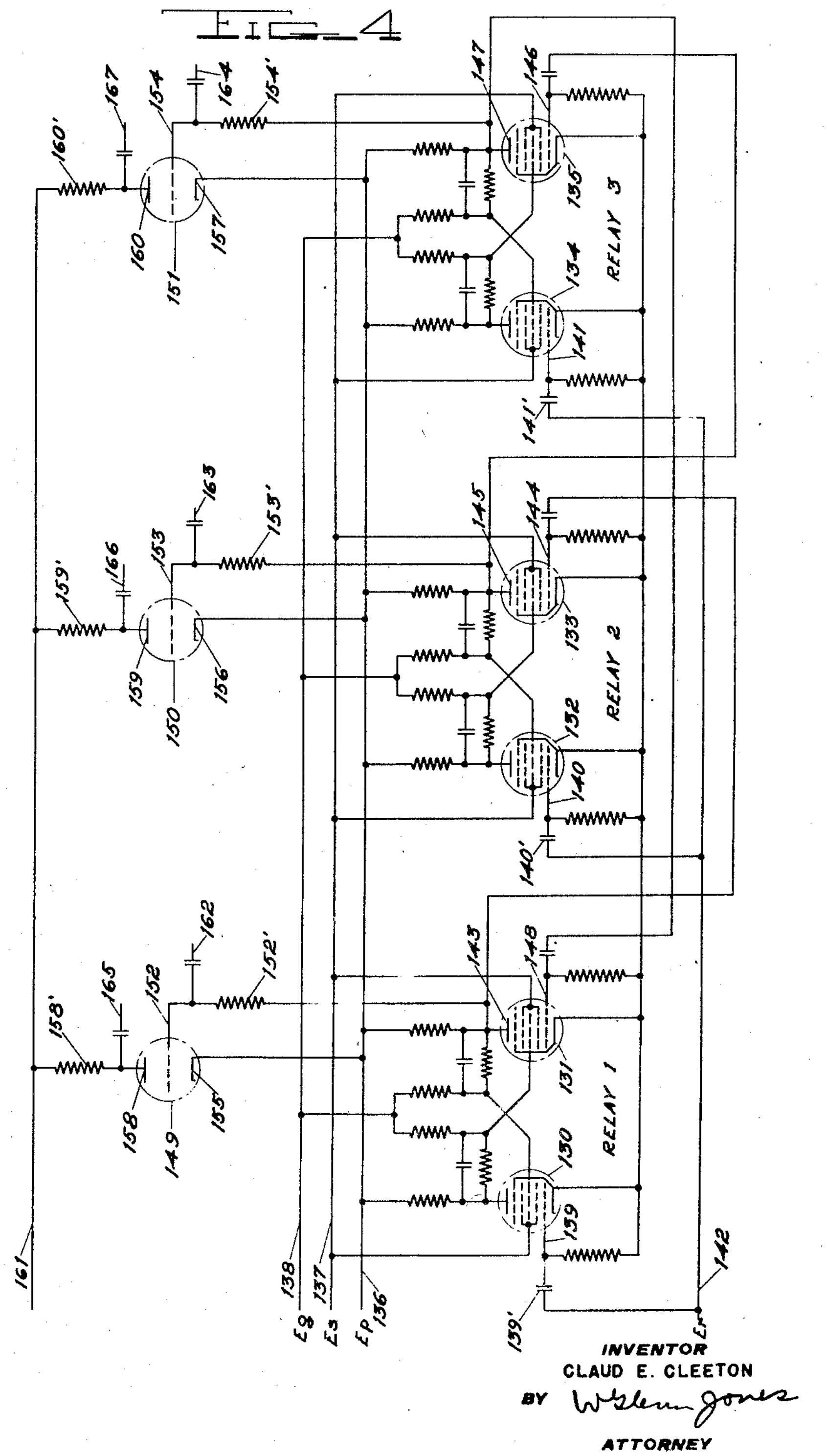
Fig. 4 is a schematic diagram for a three circuit amplifier switching circuit.

Now referring to Fig. 4, six multi-grid tubes, 130 to 135 inclusive, are used in three circuits, each of which is similar to that shown in Fig. 1, but the grids corresponding to grids 13 and 14 of Fig. 1 are separately grid leak biased and are connected, not as shown in Fig. 1, but as explained below. Each pair of tubes acts, however, in the manner described in Fig. 1, tubes 130 and 131 in what will hereinafter be denominated relay No. 1, tubes 132 and 133 in relay No. 2, and tubes 134 and 135 in relay No. 3. Amplifier tubes 149, 150 and 151, each having at least a grid, an anode and a cathode, are coupled respectively to relays No. 1, 2 and 3, so as to be controlled thereby. Each such relay and its associated amplifier tube comprises what is termed one stage; Fig. 4 thus illustrating three such stages in cascade. Anode, screen grid and bias potentials are supplied to all the relay tubes through terminals 136, 137 and 138 respectively. The grids 139, 140 and 141 of tubes 130, 132 and 134, respectively, are each connected to reset terminal 142 through separate capacitances 139′, 140′ and 141′, respectively. In addition, anode 143 of tube 131 is connected to grid 144 of tube 133, anode 145 of tube 133 is connected to control grid 146 of tube 135, and anode 147 of tube 135 is connected to control grid 148 of tube 131, each of the anode-control grid connections recited in this sentence being through a suitable capacitance.

Anode 143 of tube 131 is further connected to grid 152 of amplifier tube 149 through coupling resistance 152′, with anode 145 of tube 133 connected to grid 153 of tube 150 through coupling resistance 153′, and with anode 147 of tube 135 connected to grid 154 of tube 151 through coupling resistance 154′. The cathodes 155, 156 and 157 of the amplifier tubes are connected to the anode supply terminal 136 of the relay tubes. Anodes 158, 159 and 160 of the amplifier tubes are energized through suitable plate impedances 158′, 159′ and 160′, respectively, from terminal 161. The positive terminal of a plate supply source is connected to terminal 161. The input terminals 162, 163 and 164 of amplifier tubes 149, 150 and 151, respectively, connect to the grids 152, 153, 154 thereof through suitable capacitances while output terminals 165, 166 and 167 are respectively connected to the anodes 158, 159, 160 of these same tubes in a like manner.

In operation, when the supply voltages are applied to the circuit, one multi-grid tube of each pair will become conductive, say tubes 131, 132 and 135. The other tube of each pair will necessarily assume the opposite state as to conductivity, that is, tubes 130, 133 and 134 will become non-conductive, as explained under Fig. 1. With tube 133 non-conductive, its anode potential is practically the same as that of terminal 136. This being so, the potential of grid 153 of amplifier tube 150 will be practically the same as its cathode potential, and tube 150 will amplify voltages applied to input terminal 163, the amplified voltage appearing at output terminal 166. With tube 131 conductive, its anode potential is considerably less than the potential of terminal 136, thus making the potential of grid 152 of amplifier tube 149 sufficiently negative with respect to its cathode 155, that tube 149 will block and not amplify voltages applied to terminal 162. Similarly, with relay tube 135 conductive, amplifier tube 151 will block voltages applied to its input terminal 164.

It is thus apparent that an amplifier tube of this circuit will amplify and not block voltages applied to their inputs, only when the multi-grid tube to which each is coupled is in a non-conductive condition. When this occurs, the relay of which these tubes are a part is described as being tripped. When the multi-grid tube to which an amplifier tube is coupled is conductive, that amplifier tube will block voltages applied to its input, and the relay of which these tubes are a part is described as being set or reset.

Now, with the relays and amplifier tubes in the condition assumed when the supply voltages were applied, that is, relays No. 1 and 3 set or reset, relay No. 2 tripped, and amplifier tubes 149 and 151 blocked with amplifier tube 150 conductive, if a negative impulse be applied to reset terminal 142, such impulse will be applied to control grids 139, 140 and 141 of relay tubes 130, 132 and 134, respectively. Tubes 130 and 134 already being non-conductive, this negative pulse will produce no effect thereon. But it will produce a reversal or change-over in relay No. 2 and tube 132 will then become non-conductive with tube 133 conductive, the other stable state of this circuit. The sudden decrease in the potential of anode 145 of tube 133 when it becomes conductive will cause a negative pulse to be transmitted to control grid 146 of tube 135, and such will produce a change-over in relay No. 3, tube 134 then becoming conductive and tube 135 non-conductive. This will result in grid 154 of amplifier tube 151 having practically the same potential as its cathode 157, and tube 151 will become conductive and will amplify voltages applied to input terminal 164. The next negative pulse applied to reset terminal 142 will produce a change-over in relay No. 3 with a resultant change-over in relay No. 1, due to a negative pulse being transferred from anode 147 of tube 135 to grid 148 of tube 131, and amplifier tube 151 now becomes blocked with amplifier tube 149 conductive. Thus, it is apparent that in this circuit, each relay stage is tripped practically simultaneously with the reset of the previous relay stage, and that each amplifier tube is successively in a condition of amplification or conductivity, and is in this condition one-third of the time.

It is obvious that the arrangement of Fig. 4 may be extended to switch $n$ circuits by simply adding additional stages and by connecting the anode of one tube of the $n$th stage to the proper grid of one tube of the first stage.

The circuit of Fig. 3 could also be employed in an $n$ circuit switch and amplifier circuit, in which a pair of tubes of Fig. 3, acting as both relay and amplifier tubes, would replace the two relay tubes and coupled amplifier tube of Fig. 4. In such a case, only one of the tubes of Fig. 3 would be used as an amplifier. Since, however, the circuit of Fig. 3 responds to both positive and negative pulses, the triggering pulse from one relay stage used to trip the succeeding stage would have to pass through a rectifier, otherwise, the succeeding stage would be tripped when the anode voltage of the control tube of preceding stage was either substantially increased or decreased in value. It is obvious that an $n$ circuit switch may also be constructed where the amplifiers are controlled by the second grid of the first tube of each stage, as shown in Fig. 2. The amplifier will be in an amplifying state when the control tube is in the conducting state.

Figure 5:
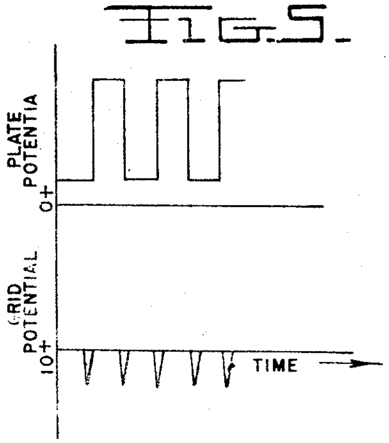
Fig. 5 shows a pair of curves indicating the relation between the grid potential applied to a trigger circuit and the resulting plate potential.

Fig. 5 shows the relation between the voltage applied to the triggering grid and the resulting plate voltage of one relay tube of a circuit such as that shown in Fig. 1, plotted as a function of time. The plate voltage of the other relay tube is 180° out of phase with the plate voltage shown in Fig. 5. This figure shows how a short pulse applied to the grid of the tripping tubes will produce a square wave output in the plate circuit, at one-half the frequency.

Figure 6:
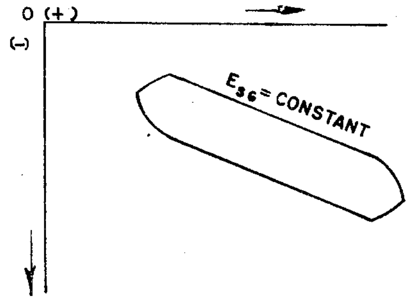
Fig. 6 is the typical working diagram for the trigger circuit.

The curve of Fig. 6 is plotted with anode supply terminal voltage as abscissae and with grid supply terminal voltage as ordinates, and shows a typical working area for the type of circuit described, the screen grid supply terminal voltage remaining constant. Points within the closed curve give voltage conditions under which the circuit will operate, points on the curve give voltages at which the circuit begins to fail and points outside the curve show voltage conditions under which the circuit is inoperative. It is apparent that the area within the curve is a measure of how critical the circuit is to variations of anode and bias supply voltages.

The circuits of Figs. 1, 2 and 4 are different from other known trigger circuits in that a multi-grid tube is used in a trigger circuit of the so-called "scale of two" type in such a way that the trigger impulses are applied to the grid of what is in effect a triode, consisting of the cathode, control grid, and screen grid for a plate, none of whose elements are used for the coupling between tubes which is essential to set up the circuit having the two stable states which may be triggered from one to another. The resulting circuit is more satisfactory than other known circuits in that the operating range, as measured by curves such as shown in Fig. 6, is larger, thereby having a circuit less critical to voltage variations. The circuits shown and described herein are not critical to the wave form of the input voltage.

The following specific values of constants have been found suitable for the circuit of Fig. 1. Corresponding values will be found satisfactory in the other circuits shown. It is to be emphasized that I do not limit myself to the specific values of constants but merely include them herein as some suggested values which have been found to be satisfactory.

In Fig. 1, resistances 33 and 34 may be about 50,000 ohms; resistances 23, 26, 28 and 30 may be about 250,000 ohms; resistance 15 may be from 10,000 to 250,000 ohms; capacitances 27 and 31 may be from 10 to 250 micromicrofarads; capacitance 17 may be small, its value depending upon the form of the input pulse. In this same figure, the voltage between terminal 32 and the tube cathodes may be from 100 to 150 volts, the voltage between terminal 20 and the tube cathodes may be from 40 to 60 volts, the voltage between terminal 24 and the tube cathodes may be from 40 to 100 volts.

New uses for the trigger circuits described herein include: A self-locking electronic relay, using multi-grid tubes for controlling electromechanical relays connected in the anode circuits of the tubes as described under Figs. 1, 2, 3 and 4, or for switching amplifier tubes by controlling the bias thereof (Figs. 2 and 4).

An $n$ circuit electronic switch using vacuum tubes (Fig. 4),

A trigger circuit using multi-grid tubes for the purpose of expanding a pulse into a square wave (illustrated graphically in Fig. 5), A trigger circuit using multi-grid tubes for the purpose of generating a square wave voltage from a sine wave source of much lower amplitude, A trigger circuit using multi-grid tubes for the purpose of frequency dividing or in electronic countercircuits.

Other modifications and changes in the number and arrangement of the parts may be made by those skilled in the art without departing from the nature of the invention, within the scope of what is hereinafter claimed.

The invention described herein may be manufactured and/or used by or for the Government of the United States for governmental purposes without the payment of any royalties thereon or therefor.

Having thus set forth and disclosed the nature of this invention, what is claimed is:

1. In combination, a plurality of cascaded stages, including a first stage and a last stage, each stage comprising a first multi-grid electron tube, a second multi-grid electron tube and an amplifier electron tube, each multi-grid tube having a cathode element, a first grid element, a second grid element, a screen grid element and an anode element, each said amplifier tube having a cathode, a grid and an anode, a common connection for all said cathode elements, a common screen grid supply means connected to said screen grid elements, separate means to apply a negative potential to each said first grid element, a resistance and a capacitance in parallel connecting the anode element of each said multi-grid tube to the second grid element of the other said multi-grid tube of the same stage, whereby the potential of the anode of each said multi-grid tube is applied to the second grid element of the other said multi-grid tube of the same stage, a common anode supply means and means including a respective anode resistance connecting each said anode element to said anode supply means, a common grid supply means and means including a respective grid resistance connecting each said second grid element to said grid supply means, a lead connecting each said cathode to said anode supply means, means including a coupling resistance connecting each said grid to the anode element of said second multi-grid tube of the same stage, whereby the voltage of the grid of said amplifier tube varies with the voltage of the anode element to which it is connected, a plate supply means for said amplifier tubes and means including a plate impedance connecting each said anode to said plate supply means, and an input means and an output means for each said amplifier tube, whereby each said amplifier tube is in an amplifying state when the multi-grid tube to which it is connected is in a non-conductive state, a common reset conductor, a capacitance connecting the first grid element of the first multi-grid tube of each stage to said re-set conductor, a capacitance connecting the anode element of said second multi-grid tube of each said stage to the first grid element of the second multi-grid tube of the following stage, a capacitance connecting the anode element of said second multi-grid tube of said last stage to the first grid element of said second multi-grid tube of said first stage, said amplifier tubes being in an amplifying state one at a time, whereby a negative pulse applied to said re-set conductor causes a reversal in the conductivity state of the multi-grid tubes both of the stage in which the amplifier tube is in an amplifying state and of the following stage, and a resultant change in the amplifying state of said amplifier tubes.

2. In combination, a plurality of cascaded stages, including a first stage and a last stage, each stage comprising a first multi-grid electron tube, a second multi-grid electron tube and an amplifier electron tube, each multi-grid tube having a cathode element, a first grid element, a second grid element, a screen grid element and an anode element, said amplifier tube having a cathode, a grid and an anode, a common connection for all said cathode elements, a common screen grid supply means connected to said screen grid elements, separate means to apply a negative potential to each said first grid element, a resistance and a capacitance in parallel connecting the anode element of each said multi-grid tube to the second grid element of the other said multi-grid tube of the same stage, whereby the potential of the anode of each said multi-grid tube is applied to the second grid element of the other said multi-grid tube of the same stage, a common anode supply means and means including a respective anode resistance connecting each said anode element to said anode supply means, a common grid supply means and means including a respective grid resistance connecting each said second grid element to said grid supply means, a lead connecting each said cathode to said anode supply means, means including a coupling resistance connecting each said grid to the anode element of said second multi-grid tube of the same stage whereby the voltage of the grid of said amplifier tube varies with the voltage of the anode element to which it is connected, a plate voltage means for said amplifier tubes, means including a plate impedance connecting each said anode to said plate supply means, and an input means and an output means for each said amplifier tube, whereby each said amplifier tube is in an amplifying state when the multi-grid tube to which it is connected is in a non-conductive state, a common re-set conductor, a capacitance connecting the first grid element of the first multi-grid tube of each stage to said re-set conductor, a capacitance connecting the anode element of said second multi-grid tube of each said stage to the first grid element of the second multi-grid tube of the following stage, a capacitance connecting the anode element of said second multi-grid tube of said last stage to the first grid element of said second multi-grid tube of the said first stage, said amplifier tubes being in an amplifying state one at a time, whereby a negative pulse applied to said re-set conductor causes a reversal in the conductivity state of the multi-grid tubes of two of said stages and a change in the amplifying state of the amplifier tubes of said same two stages.

3. In combination, a plurality of cascaded stages including a first stage and a last stage, each said stage comprising an electronic relay means and an amplifying means, each said relay means including a first multi-grid electron tube and a second multi-grid electron tube, each said multi-grid tube having a first grid element, a second grid element, a cathode element, a screen grid element and an anode element, each said amplifying means including an amplifier tube having a grid, a cathode and an anode, said relay means being responsive to negative pulses for changing the conductive state of said multi-grid tubes, means coupling the grid of each said amplifier tube to the anode element of said second multi-grid tube of the same stage whereby each said amplifying means is in an amplifying state when said second multi-grid tube of the same stage is in a non-conductive state, a common re-set conductor coupled to the first grid element of each said first multi-grid tube, means coupling the anode element of the said second multi-grid tube of each stage to the first grid element of said second multi-grid tube of the following stage, means coupling the anode element of said second multi-grid tube of said last stage to the first grid element of the second multi-grid tube of said first stage, whereby a negative pulse applied to said re-set conductor causes a reversal in the conductivity state of the multi-grid tubes of said two stages and a change in the amplifying state of the amplifying means of said same two stages, said amplifying means being in an amplifying state one at a time.

4. In combination, a plurality of cascaded stages including a first stage and a last stage, each said stage comprising an electronic relay means and an amplifying means, each said relay means including a first multi-grid electron tube and a second multi-grid electron tube, each said multi-grid tube having a first grid element, a second grid element, a cathode element, a screen grid element and an anode element, each said amplifying means including an amplifier tube having a grid, a cathode and an anode, said relay means being responsive to negative pulses for changing the conductive state of said multi-grid tubes, means coupling the grid of each said amplifier tube to the anode element of said second multi-grid tube of the same stage, whereby each said amplifying means is in an amplifying state when said second multi-grid tube of the same stage is in a non-conductive state, a common re-set conductor coupled to the first grid element of each said first multi-grid tube, means coupling the anode element of the said second multi-grid tube of each stage to the first grid element of said second multi-grid tube of the following stage, means coupling the anode element of said second multi-grid tube of said last stage to the first grid element of the second multi-grid tube of said first stage, whereby a negative pulse applied to said re-set conductor causes a reversal in the conductivity state of the multi-grid tubes of two of said stages and a change in the amplifying state of the amplifying means of said same two stages, said amplifying means being in an amplifying state one at a time, and an input means and an output means for each said amplifying means.

5. In combination, a plurality of cascaded stages, each stage comprising an electronic relay means and an amplifying means, each electronic relay means including two multi-grid electron tubes, each amplifying means including another electron tube controlled by said relay means of the same stage, said multi-grid tubes being responsive to negative pulses for changing the conductive state thereof, said amplifying means being in an amplifying state one at a time, a common input means for the relay means of said stages adapted to supply a negative tripping pulse to said relay means simultaneously in parallel thereby to cause a reversal in the conductivity state of the multi-grid tubes of two of said stages and a change in the amplifying state of the amplifying means of said same two stages.

6. In combination, a plurality of cascaded stages, each stage comprising an electronic relay means and an amplifying means, each electronic relay means including two multi-grid electron tubes, each amplifying means including another electron tube controlled by said relay means of the same stage, said multi-grid tubes being responsive to negative pulses for changing the conductive state thereof, said amplifying means being in an amplifying state one at a time, a common input means for the relay means of said stages adapted to supply a negative tripping pulse to said relay means simultaneously in parallel thereby to cause a reversal in the conductivity state of the multi-grid tubes of two of said stages and a change in the amplifying state of the amplifying means of said same two stages, and separate input and output means for each said amplifying means.

7. In combination, a plurality of electronic relay stages connected in cascade relation, each of said relay stages comprising a pair of electron tubes cross-connected to form a regenerative trigger circuit having two distinct states of conduction, a separate amplifier means operatively connected to each of said relay stages, whereby the same are rendered conducting responsive to the existence of one of the states of the corresponding relay stage and non-conducting responsive to existence of the other of the states, input means connected to said cascaded relay stages in parallel over which an input signal may be applied simultaneously to all of the relay stages to reverse in succession the states of said relays, and separate input and output means connected to said amplifying means.

8. An electronic switch comprising a plurality of vacuum tubes, means regeneratively intercoupling said tubes in pairs to vary the conductance characteristic of the tubes of each pair in opposite senses in response to an impulse applied to either of the tubes of the pair, means coupling said pairs in cascade, means simultaneously applying impulses to at least one tube in each pair, said impulses being effective to vary the conductance characteristic of successive pairs of said tubes in like manner, thereby to complete successive steps of a control sequence, and a plurality of output circuits individually coupled to at least one tube of each of said pairs and adapted successively to have the energization thereof modified during the cycle of variation of the conductance characteristic of the pair of tubes associated therewith.

9. In combination, a plurality of electronic devices each of which devices includes an anode, a cathode and a control electrode means, means connecting each anode to corresponding control electrode means, to form trigger pairs, and means connecting the devices of different trigger pairs together in an endless chain operative series, said chain connections being from the anodes of at least one device in a pair to the control electrode means of at least one device in another pair.

10. In combination, a plurality of electronic devices, each of which devices includes an anode, a cathode, and a means for controlling conduction in the device, means for connecting the electronic devices in pairs by connecting the anode of one device of the pair to the control means of the other device of the pair to form trigger pairs in which at any stage of operation of a pair one or the other of the electronic devices is conducting and the other is non-conducting, means for connecting the trigger pairs so that they will be operated one pair at a time in sequence in response to negative input pulses, including connections between the anode of at least one electronic device of each pair and the control means of at least one of the devices of another pair for selectively modifying the controlling effect of the control means of the pairs in succession and thereby enabling the trigger pairs to be responsive and change their mode of operation one after another in succession in response to the negative impulses; and means coupled to the control means of at least one electronic device in each pair for simultaneously impressing negative impulses on all the pairs of electronic devices and causing the trigger pairs in which the effect of the control means has been modified to respond to the impulses and change its mode of operation.

11. In combination, a plurality of vacuum tubes each tube containing an anode, a cathode and means for controlling conduction therein; means connecting the tubes in a plurality of trigger pairs with the anode of each tube of the pair connected to the control means of the other tube of the pair, means connecting the tubes of the trigger pairs together in a ring for causing the selective operation of the trigger pairs, one pair after another in sequence, in response to negative impulses impressed on the tubes, the connection between trigger pairs extending from the anode of at least one tube in the pair to the control means of at least one tube of another pair, and means coupled to the control means of at least one tube in each pair by which negative potential impulses are impressed on the tubes.

12. In combination a plurality of vacuum tubes, each having an anode, a cathode, and a control means, means connecting the tubes in trigger pairs with the anode of each tube of a pair connected to the control means of the other tube of the pair, and means connecting the different pairs together in an endless chain operative sequence in which the anode of at least one tube of a trigger pair is connected to the control means of at least one tube of another trigger pair and can control the effect of the control means to select the pairs for sequential operation.

13. In combination, a plurality of vacuum tubes, each having an anode, a cathode and a control means, means connecting the tubes in trigger pairs with the anode of each tube of a pair connected to the control means of the other tube of the pair, means connecting said trigger pairs in cascade wherein the anode of at least one tube of each pair is connected to the control means of at least one tube of a succedent trigger pair and means supplying a tripping pulse to said trigger pairs in parallel.

CLAUD E. CLEETON.

(References on following page)

REFERENCES CITED

The following references are of record in the file of this patent:

UNITED STATES PATENTS

| Number | Name | Date |
|---|---|---|
| 2,132,654 | Smith | Oct. 1, 1938 |
| 2,146,862 | Shumard | Feb. 14, 1939 |
| 2,158,285 | Koch | May 16, 1939 |
| 2,189,317 | Koch | Feb. 6, 1940 |
| 2,194,559 | Koch | Mar. 26, 1940 |
| 2,221,115 | Shepard, Jr. | Nov. 12, 1940 |
| 2,306,386 | Hollywood | Dec. 29, 1942 |
| 2,324,314 | Michel | July 13, 1943 |
| 2,396,395 | Smith et al. | Mar. 12, 1946 |
| 2,404,918 | Overbeck | July 30, 1946 |
| 2,404,919 | Overbeck | July 30, 1946 |
| 2,421,606 | Fitch | June 3, 1947 |
| 2,426,454 | Johnson | Aug. 26, 1947 |

OTHER REFERENCES

Electronics, August 1939, "Trigger Circuits," by Reich, pages 14–17.